United States Patent
Chen et al.

(10) Patent No.: US 9,143,802 B2
(45) Date of Patent: Sep. 22, 2015

(54) FRAGMENTED PARAMETER SET FOR VIDEO CODING

(71) Applicant: Qualcomm Incorporated, San Diego, CA (US)

(72) Inventors: Ying Chen, San Diego, CA (US); Ye-Kui Wang, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 13/664,057

(22) Filed: Oct. 30, 2012

(65) Prior Publication Data

US 2013/0107942 A1     May 2, 2013

Related U.S. Application Data

(60) Provisional application No. 61/553,652, filed on Oct. 31, 2011.

(51) Int. Cl.
| | |
|---|---|
| *H04N 7/26* | (2006.01) |
| *H04N 19/66* | (2014.01) |
| *H04N 19/70* | (2014.01) |
| *H04N 19/463* | (2014.01) |
| *H04N 5/91* | (2006.01) |

(52) U.S. Cl.
CPC .............. *H04N 19/66* (2014.11); *H04N 19/463* (2014.11); *H04N 19/70* (2014.11)

(58) Field of Classification Search
CPC . H04N 7/50; H04N 7/26244; H04N 7/26085; H04N 7/26079; H04N 7/26271
USPC ........................................................ 375/240.03
See application file for complete search history.

(56) References Cited

U.S. PATENT DOCUMENTS

| | | | |
|---|---|---|---|
| 6,363,119 B1 | 3/2002 | Oami | |
| 7,236,526 B1 * | 6/2007 | Kitamura | ................. 375/240.16 |
| 7,965,896 B2 | 6/2011 | Tanizawa et al. | |

(Continued)

FOREIGN PATENT DOCUMENTS

| | | |
|---|---|---|
| JP | 2011061363 A | 3/2011 |
| JP | 2011091848 A | 5/2011 |

(Continued)

OTHER PUBLICATIONS

Wiegand et al.,"WD1: Working Draft 1 of High-Efficiency Video Coding", Joint Collaborative Team on Video Coding, JCTVC-C403, Oct. 7-15, 2010, 137 pp.

(Continued)

*Primary Examiner* — Sath V Perungavoor
*Assistant Examiner* — Howard D Brown, Jr.
(74) *Attorney, Agent, or Firm* — Shumaker & Sieffert, P.A.

(57) ABSTRACT

A video encoder generates a first network abstraction layer (NAL) unit. The first NAL unit contains a first fragment of a parameter set associated with video data. The video encoder also generates a second NAL unit. The second NAL unit contains a second fragment of the parameter set. A video decoder may receive a bitstream that includes the first and second NAL units. The video decoder decodes, based at least in part on the parameter set, one or more coded pictures of the video data.

30 Claims, 6 Drawing Sheets

(56) References Cited

U.S. PATENT DOCUMENTS

| | | | |
|---|---|---|---|
| 2007/0110390 A1* | 5/2007 | Toma | 386/68 |
| 2007/0230564 A1* | 10/2007 | Chen et al. | 375/240.01 |
| 2008/0240236 A1* | 10/2008 | Uchida et al. | 375/240.03 |
| 2009/0003447 A1 | 1/2009 | Christoffersen et al. | |
| 2009/0177949 A1 | 7/2009 | Lamy-Bergot et al. | |
| 2011/0182524 A1 | 7/2011 | Shibata et al. | |
| 2011/0200266 A1 | 8/2011 | Fuchie et al. | |
| 2012/0033039 A1 | 2/2012 | Sasaki et al. | |
| 2012/0229602 A1 | 9/2012 | Chen et al. | |
| 2012/0236934 A1* | 9/2012 | Chen et al. | 375/240.03 |
| 2013/0022113 A1* | 1/2013 | Chen et al. | 375/240.12 |

FOREIGN PATENT DOCUMENTS

| | | |
|---|---|---|
| KR | 20080050941 A | 6/2008 |
| WO | 2005076614 A1 | 8/2005 |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d1, Jul. 14-22, 2011, 222 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Liu et al., "Method and syntax for partial CU merge," Joint Collaborative Team on Video Coding, Document: JCTVC-E085, Mar. 16-23, 2011, 5 pp.

Suzuki et al., "Proposal to support quantization matrix in HEVC," Joint Collaborative Team on Video Coding, JCTVC-F362, Jul. 14-22, 2011, 11 pp.

Tanaka et al., "Quantization Matrix for HEVC," Joint Collaborative Team on Video Coding, JCTVC-E073, Mar. 16-23, 2011, 24 pp.

Wenger et al., "Adaptation Parameter Set (APS)," Joint Collaborative Team on Video Coding, JCTVC-F747r3, Jul. 14-22, 2011, 10 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "WD2: Working Draft 2 of High-Efficiency Video Coding", Joint Collaborative Team on Video Coding, JCTVC-D503, Jan. 20-28, 2011, 153 pp.

Zhou et al., "Compact representation of quantization matrices for HEVC," Joint Collaborative Team on Video Coding, JCTVC-D024, Jan. 20-28, 2011, 9 pp.

Chen et al., "Quantization matrices in fragmented APS", Joint Collaborative Team on Video Coding, JCTVC-G658, Nov. 21-30, 2011, 3 pp.

International Search Report and Written Opinion—PCT/US2012/062780—ISA/EPO—Jan. 18, 2013—15 pp.

Tanaka et al., "Enhancement of quantization matrix coding for HEVC", Joint Collaborative Team on Video Coding, JCTVC-F475, Jul. 14-22, 2011, 11 pp.

Wenger et al.,"Adaptive Slice Parameter Set (APS)", Joint Collaborative Team on Video Coding, JCTVC-F747, Jul. 14-22, 2011, 8 pp.

Zhou et al., "Further study on compact representation of quantization matrices," Joint Collaborative Team on Video Coding, JCTVC-F085, Jul. 14-22, 2011, 4 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Response to Written Opinion dated Jan. 18, 2013, from International Application No. PCT/US2012/062780, filed on May 14, 2013, 24 pp.

Second Written Opinion from International Application No. PCT/US2012/062780, dated Sep. 26, 2013, 5 pp.

Response to Second Written Opinion dated Sep. 26, 2013, from International Application No. PCT/US2012/062780, filed on Nov. 21, 2013, 20 pp.

International Preliminary Report on Patentability—PCT/US2012/062780, The International Bureau of WIPO—Geneva, Switzerland, Feb. 7, 2014, 8 pp.

Provisional U.S. Appl. No. 61/547,647, by Joshi; Rajan Laxman et al., filed Oct. 14, 2011.

Notice of Grounds for Rejections from counterpart Korean Application No. 2014-7013904, dated Jun. 2, 2015, 10 pp.

First Office Action, and translation thereof, from counterpart Japanese Application No. 2014-540036, dated Jun. 2, 2015, 7 pp.

Notice of Grounds for Rejection from counterpart Korean Application No. 2014-7013904, dated Jun. 2, 2015, 10 pp.

* cited by examiner

FRAGMENTED PARAMETER SET FOR VIDEO CODING

This application claims the benefit of U.S. Provisional Patent Application No. 61/553,652, filed Oct. 31, 2011, the entire content of which is hereby incorporated by reference.

TECHNICAL FIELD

This disclosure relates to video coding (i.e., encoding and/or decoding of video data) and particularly to parameter sets in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, a video encoder generates multiple network abstraction layer (NAL) units. The NAL units contain different fragments of a parameter set associated with video data. A video decoder may receive a bitstream that includes the NAL units that contain the fragments of the parameter set. The video decoder decodes, based at least in part on the parameter set, one or more coded pictures of the video data.

In one aspect, this disclosure describes a method for encoding video data. The method comprises generating a first NAL unit. The first NAL unit contains a first fragment of a parameter set associated with the video data. The method also comprises generating a second NAL unit. The second NAL unit contains a second fragment of the parameter set, the first and second NAL units are non-video coding layer (VCL) NAL units.

In another aspect, this disclosure describes a method of decoding video data. The method comprises receiving a bitstream that comprises a first NAL unit and a second NAL unit. The first NAL unit contains a first fragment of a parameter set and the second NAL unit contains a second fragment of the parameter set. The first and second NAL units are non-VCL NAL units. In addition, the method comprises decoding, based at least in part on the parameter set, one or more coded pictures of the video data.

In another aspect, this disclosure describes a computing device that comprises one or more processors configured to generate a first NAL unit. The first NAL unit contains a first fragment of a parameter set associated with video data. The one or more processors are also configured to generate a second NAL unit. The second NAL unit contains a second fragment of the parameter set. The first and second NAL units are non-VCL NAL units.

In another aspect, this disclosure describes a computing device that comprises means for generating a first NAL unit. The first NAL unit contains a first fragment of a parameter set associated with video data. The computing device also comprises means for generating a second NAL unit. The second NAL unit contains a second fragment of the parameter set. The first and second NAL units are non-VCL NAL units.

In another aspect, this disclosure describes a computer-readable storage medium that stores instructions that, when executed by one or more processors of a computing device, cause the computing device to generate a first NAL unit. The first NAL unit contains a first fragment of a parameter set associated with video data. The instructions also cause the computing device to generate a second NAL unit. The second NAL unit contains a second fragment of the parameter set. The first and second NAL units are non-VCL NAL units.

In another aspect, this disclosure describes a computing device that comprises one or more processors configured to receive a bitstream that comprises a first NAL unit and a second NAL unit. The first NAL unit contains a first fragment of a parameter set. The second NAL unit contains a second fragment of the parameter set. The first and second NAL units are non-VCL NAL units. The one or more processors are also configured to decode, based at least in part on the parameter set, one or more coded pictures of video data.

In another aspect, this disclosure describes a computing device that comprises means for receiving a bitstream that comprises a first NAL unit and a second NAL unit. The first NAL unit contains a first fragment of a parameter set and the second NAL unit contains a second fragment of the parameter set. The first and second NAL units are non-VCL NAL units. In addition, the computing device comprises means for decoding, based at least in part on the parameter set, one or more coded pictures of video data.

In another aspect, this disclosure describes a computer-readable storage medium that stores instructions that, when executed by one or more processors of a computing device, cause the computing device to receive a bitstream that comprises a first NAL unit and a second NAL unit. The first NAL unit contains a first fragment of a parameter set and the second NAL unit contains a second fragment of the parameter set. The first and second NAL units are non-VCL NAL units. The instructions also cause the computing device to decode, based at least in part on the parameter set, one or more coded pictures of video data.

The details of one or more examples of the disclosure are set forth in the accompanying drawings and the description below. Other features, objects, and advantages will be apparent from the description, drawings, and claims.

DETAILED DESCRIPTION

When a bitstream is transmitted in a communications network, the bitstream may be divided into a series of packets that conform to a communications protocol, such as the real-time protocol (RTP). There is a limit, such as a maximum transmission unit (MTU) size, on the amount of data that a single packet can contain. Typically, each of the packets contains a single network abstraction layer (NAL) unit. However, if a NAL unit is larger than the MTU size, the NAL unit is split and is transported in two or more packets. In general, it is undesirable to split a NAL unit among two or more packets because the entire NAL unit may be useless if even a single one of the packets is lost or corrupted during transmission of the packets.

A video encoder may generate NAL units that contain parameter sets, such as picture parameter sets (PPSs) and sequence parameter sets (SPSs). The inclusion of quantization matrices in a parameter set may cause a NAL unit that contains the parameter set to be larger than an MTU size of an end-to-end transmission path. Accordingly, a packetizer may split the NAL unit among two or more packets. Splitting the NAL unit among multiple packets may be undesirable because the loss of any one of the packets may render the entire NAL unit useless. This is because video decoder 30 may be unable to interpret the data in the received portion of the NAL unit without the data in the lost portion of the NAL unit.

In accordance with the techniques of this disclosure, a video encoder may generate multiple NAL units that contain different fragments of a parameter set. For example, the video encoder may generate a first NAL unit and a second NAL unit. The first NAL unit may contain a first fragment of the parameter set and the second NAL unit may contain a second fragment of the parameter set. Other NAL units may contain other fragments of the parameter set. Each NAL unit that contains a different fragment of the parameter set may be transmitted in a separate packet on a communication channel. The sizes of packets encapsulating the NAL units that contain the fragments of the parameter set may be less than or equal to the MTU size. Sending fragments of the parameter set in different NAL units may increase error resiliency in the sense that any received fragment of the parameter set may still be useful, regardless of whether other fragments of the parameter set are received.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
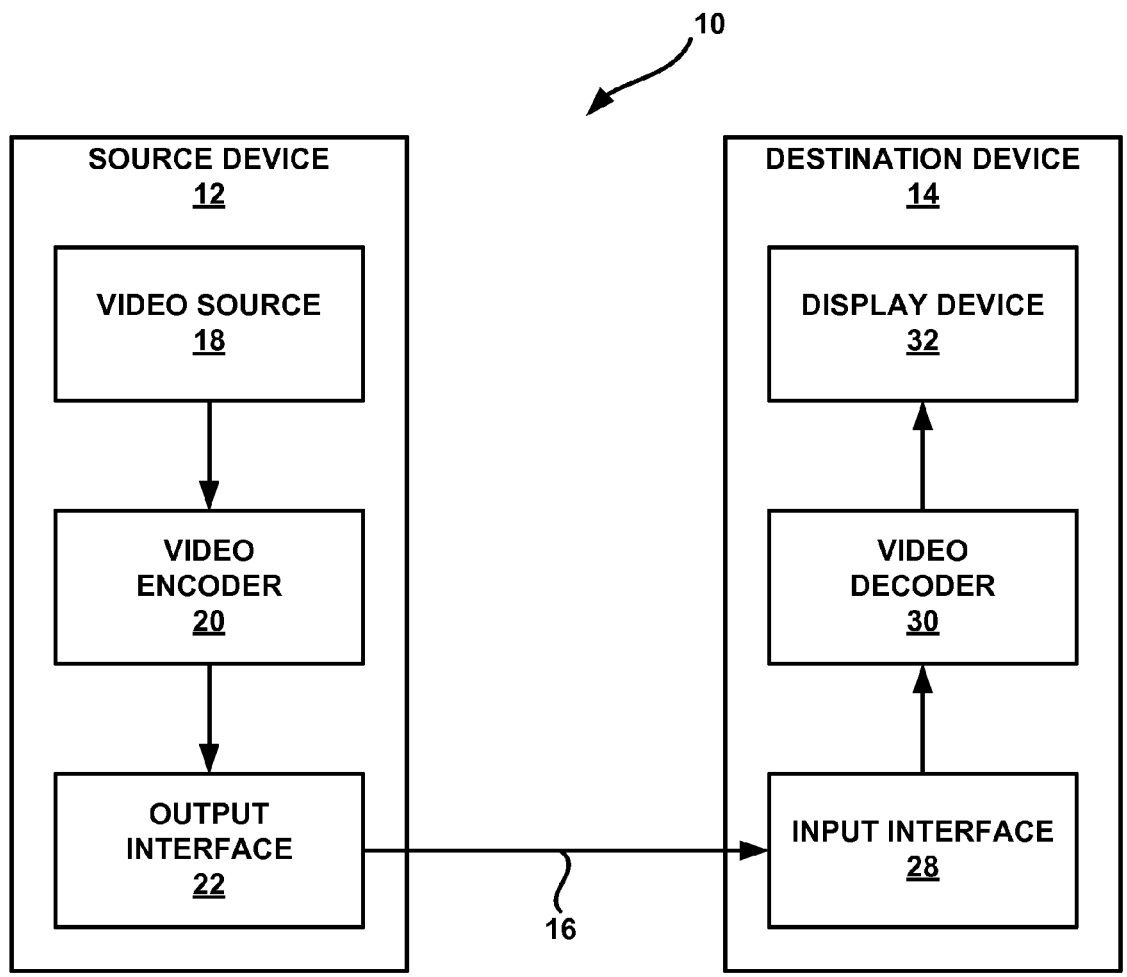
FIG. 1 is a block diagram illustrating an example video coding system that may implement one or more of the techniques described in this disclosure.

FIG. 1 is a block diagram that illustrates an example video coding system 10 that may implement the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise a type of medium or device capable of moving the encoded video data from source device 12 to destination device 14. In one example, channel 16 may comprise one or more communication media that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise one or more wireless or wired communication media, such as a radio frequency (RF) spectrum and/or one or more physical transmission lines. The communication medium may form part of a packet-based network, such as a local area network, a wide-area network, or a global network such as the Internet. The communication medium may include routers, switches, base stations, or other equipment that facilitate communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

The techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some cases, output interface 22 may include a modulator/demodulator (modem) and/or a transmitter. Video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 may include a receiver and/or a modem. Input interface 28 of destination device 14 may receive encoded video data over channel 16.

Display device 32 may be integrated with or may be external to destination device 14. In some examples, destination device 14 may include an integrated display device and may also be configured to interface with an external display device. In other examples, destination device 14 may be a display device. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 4" or "WD4," is described in Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, Italy, July, 2011, which, as of Sep. 27, 2012, is downloadable from: http://phenix.int-evey.fr/jct/doc_end_user/documents/6_Torino/wg11/JCTVC-F803-v3.zip, the entire content of which is incorporated herein by reference.

Alternatively, video encoder 20 and video decoder 30 may operate according to other proprietary or industry standards, including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The techniques of this disclosure, however, are not limited to any particular coding standard or technique.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to various encoded portions of video data. In some cases, such syntax elements may be encoded and stored (e.g., in a storage system) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium in an encoded bitstream at the time of encoding, which then may be retrieved by a decoding device at any time after being stored to this medium.

Video encoder 20 may receive video data from video source 18 or another source. The video data may represent a series of pictures. Each of the pictures may be a still image forming part of a video. In some instances, a picture may be referred to as a video "frame."

Video encoder 20 may generate a bitstream that includes coded pictures and associated data. A coded picture is a coded representation of a picture. The associated data may include sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. A sample may be a value that indicates a luminance value or a chrominance value of a pixel. Each of the video blocks is associated with a tree block. In some instances, a tree block may be referred to as a largest coding unit (LCU) or a "coding tree block." The tree blocks of HEVC may be broadly analogous to the macroblocks of previous standards, such as H.264/AVC. However, a tree block is not necessarily limited to a particular size and may include one or more coding units (CUs). Video encoder 20 may use quad-tree partitioning to partition the video blocks of tree blocks into video blocks associated with CUs, hence the name "tree blocks."

Video encoder 20 may partition each picture of the video data into one or more slices. A slice may include an integer number of tree blocks. Video encoder 20 may generate encoded data associated with each slice of the picture. The encoded data associated with a slice may be referred to as a "coded slice." To generate a coded slice, video encoder 20 may generate encoded data associated with each tree block in a slice. The encoded data associated with a slice may be referred to as a coded tree block.

To generate a coded tree block, video encoder 20 may recursively perform quad-tree partitioning on the video block of the tree block to divide the video block into progressively smaller video blocks. Each of the smaller video blocks may be associated with a different CU. A partitioned CU may be a CU whose video block is partitioned into video blocks associated with other CUs. A non-partitioned CU may be a CU whose video block is not partitioned into video blocks associated with other CUs.

Video encoder 20 may generate one or more prediction units (PUs) for each non-partitioned CU. Each of the PUs of the CU may be associated with a different video block within the video block of the CU. Video encoder 20 may generate a predictive video block for each PU of the CU. The predictive video block of a PU may be a block of samples.

Video encoder 20 may use intra prediction or inter prediction to generate the predictive video block for a PU. If video encoder 20 uses intra prediction to generate the predictive video block of a PU, video encoder 20 may generate the predictive video block of the PU based on decoded samples of the picture associated with the PU.

If video encoder 20 uses inter prediction to generate the predictive video block of a PU of a picture, video encoder 20 may search a set of reference pictures associated with the picture to identify one or more reference blocks in the reference pictures. The reference blocks may be video blocks that visually correspond to the video block of the PU. The reference pictures are pictures other than the picture that contains the PU. Video encoder 20 may generate motion information (e.g., reference picture indexes, motion vectors, prediction direction indicators, etc.) for the PU. As described below, video decoder 30 may use the motion information for the PU to identify the one or more reference blocks. In addition, video encoder 20 may generate a predictive video block of the PU based on the one or more identified reference blocks.

Video encoder 20 may generate residual video blocks for a CU based on predictive video blocks of the PUs of the CU. The residual video blocks for the CU may indicate differences between samples in the predictive video blocks for the PUs of the CU and the original video blocks of the CU.

Furthermore, video encoder 20 may perform recursive quad-tree partitioning to partition the residual video blocks of the CU into residual video blocks associated with TUs of the CU. Video coder 20 may apply one or more transforms to residual video blocks associated with the TUs to generate coefficient blocks (i.e., blocks of coefficients). Conceptually, a coefficient block may be a two-dimensional (2D) matrix of coefficients. Video encoder 20 may perform a quantization process on the coefficient blocks. Quantization generally refers to a process in which coefficients are quantized to possibly reduce the amount of data used to represent the coefficients, providing further compression. Video encoder 20 may generate sets of syntax elements that represent the coefficients in the quantized coefficient block. Video encoder 20 may apply entropy encoding operations, such as Context Adaptive Binary Arithmetic Coding (CABAC) operations, to at least some of these syntax elements.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a SPS, a PPS, a coded slice, supplemental enhancement information (SEI), an access unit delimiter, filler data, or another type of data. Coded slice NAL units are NAL units that include coded slices. A video coding layer (VCL) NAL unit is another term for coded slice NAL units. Non-VCL NAL units are NAL units that are not VCL NAL units.

Video decoder 30 may receive the bitstream generated by video encoder 20. The bitstream may include a coded representation of the video data encoded by video encoder 20. Video decoder 30 may perform a parsing operation on the bitstream. As part of performing the parsing operation, video decoder 30 may extract syntax elements from the bitstream. As part of extracting syntax elements from the bitstream, video decoder 30 may perform entropy decoding (e.g., CABAC decoding) operations on data in the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

Video decoder 30 may generate, based on syntax elements associated with a CU in a picture, predictive video blocks for PUs of the CU. In some instances, video decoder 30 may use intra prediction to generate a predictive video block for a PU based on decoded samples of the picture associated with the PU. In other instances, video decoder 30 may use inter prediction to generate a predictive video block for a PU based on reference pictures in a set of reference pictures associated with the current picture. If video decoder 30 uses inter prediction to generate the predictive video block of a PU, video decoder 30 may use the motion information for the PU to identify one or more reference blocks in a set of reference pictures. Video decoder 30 may generate the predictive video block of the PU based on the one or more reference blocks.

Video decoder 30 may inverse quantize coefficient blocks associated with TUs of a CU. Video decoder 30 may apply inverse transforms on the inverse quantized coefficient blocks to reconstruct residual video blocks associated with the TUs of the CU. Video decoder 30 may reconstruct the video block of a CU based on the predictive video blocks and the residual video blocks. In this way, video decoder 30 may reconstruct the video blocks of CUs based on the syntax elements in the bitstream.

As mentioned above, video encoder 20 may quantize coefficient blocks and video decoder 30 may inverse quantize coefficient blocks. In some examples, video encoder 20 uses quantization matrices to quantize coefficient blocks. A quantization matrix may be a 2-dimensional array of values that has the same dimensions as a coefficient block. When video encoder 20 quantizes a coefficient in a coefficient block associated with a TU of a CU, video encoder 20 may multiply a quantization parameter (QP) value associated with the CU by a value that is at a position in the quantization matrix that corresponds to a position of the coefficient in the coefficient block. Video decoder 30 may use the same QP value and quantization matrix when inverse quantizing a coefficient block that video encoder 20 used when quantizing the coefficient block.

Video encoder 20 may use different quantization matrices when quantizing different coefficient blocks of the same size. The use of different quantization matrices when quantizing different coefficient blocks of the same size may improve the subjective quality of the decoded video data. Video encoder 20 may dynamically generate the quantization matrices used to quantize coefficient blocks of the same size. Because video encoder 20 may dynamically generate quantization matrices, video decoder 30 is not preconfigured with all the quantization matrices that video encoder 20 may use.

Because video decoder 30 uses the same quantization matrix to inverse quantize a coefficient block that video encoder 20 uses to quantize the coefficient block and because video decoder 30 is not preconfigured with all the quantization matrices that video encoder 20 may use, video encoder 20 may include the quantization matrices in the bitstream. For example, the bitstream may include a parameter set that signals a plurality of quantization matrices. In this example, video encoder 20 may include in a PPS the quantization matrices that are used to quantize coefficient blocks in slices associated with the PPS. In another example, video encoder 20 may include in a SPS the quantization matrices that are used, in conjunction with QP values, to quantize coefficient blocks in slices associated with PPSs that are associated with the SPS.

As indicated above, video encoder 20 may generate NAL units that contain PPSs and SPSs. NAL units that contain PPSs and SPSs are non-VCL NAL units. The inclusion of quantization matrices in a PPS or a SPS may cause a NAL unit that contains the PPS or the SPS to be larger than an MTU size of an end-to-end transmission path. The MTU size may be various sizes. For example, the MTU size of an end-to-end transmission path over Ethernet at the network layer may be 1500 bytes. In another example, the MTU size of an end-to-end transmission path involving some types of wireless networks may be 200 or 300 bytes. In other examples, the MTU size may be a maximum size of a transmission unit in various communication protocols at various layers of a network stack, such as a physical layer, a network layer, a transport layer, an application layer, and so on. Accordingly, a packetizer may split a NAL unit that is larger than the MTU size among two or more packets. Splitting a NAL unit among multiple packets may be undesirable because the loss of any one of the packets may render the entire NAL unit useless. This is because video decoder 30 may be unable to interpret the data in the received portion of the NAL unit without the data in the lost portion of the NAL unit.

For H.264/AVC, separate quantization matrices are used for intra prediction, inter prediction, and also for Y, Cb and Cr components. There are six quantization matrices for 4×4 coefficient blocks, in H.264/AVC. H.264/AVC only allows quantization matrices for 8×8 Y-component coefficient blocks. Thus, in H.264/AVC, there are two possible quantization matrices for 8×8 coefficient blocks.

In the draft HEVC standard, transform sizes of 4×4, 8×8, 16×16, and 32×32 are possible. Furthermore, in the draft HEVC standard, there may be twenty-four quantization matrices (i.e., separate quantization matrixes for 4×4, 8×8, 16×16, and 32×32 coefficient blocks, intra/inter, and Y, Cb, Cr components). Thus, it may be necessary to signal 8160 values. Using the same method as used for H.264/AVC (zig-zag scan, first order prediction and exponential Golomb coding of the prediction residual) may require roughly 25,000 bits to signal all twenty-four quantization matrices. Thus, even when using efficient compression methods, it may not be feasible to generate a single NAL unit that can contain the quantization matrices and can be encapsulated in a single transmission unit (e.g., an Real-time Transport Protocol packet) without been framed by underlying transmission protocols.

In accordance with the techniques of this disclosure, video encoder 20 may generate multiple NAL units that contain different fragments of the same parameter set. The parameter set may be a SPS, a PPS, an APS, or another type of parameter set. The size of each of these NAL units may be less than or equal to an MTU size (which e.g., is about 1500 bytes) of an end-to-end transmission path over which source device 12 is to send the NAL units.

For example, video encoder 20 may generate a first NAL unit. The first NAL unit may contain a first fragment of a parameter set associated with video data. In addition, video encoder 20 may generate a second NAL unit. The second NAL unit may contain a second fragment of the parameter set. The first and second NAL units may be non-VCL NAL units. In this example, source device 12 or another computing device may encapsulate the first NAL unit in a first packet of a communication protocol. Source device 12 or another computing device may encapsulate the second NAL unit in a second packet of the communication protocol. Source device 12 or another computing device may send the first and second packets on channel 16. Destination device 14 may receive a bitstream that includes the first and the second packets in the communication protocol.

Video encoder 20 may generate the fragments of the parameter set such that each of the fragments may be at least somewhat useful to video decoder 30, even if each other fragment of the parameter set is lost. For example, video encoder 20 may generate the fragments such that video decoder 30 does not need any data in another fragment of the parameter set to properly interpret data in the fragment. For instance, in this example, video encoder 20 may generate a first NAL unit that includes a first fragment and may generate a second NAL unit that contains a second fragment. The first fragment may be decodable without reference to the second fragment and the second fragment may be decodable without reference to the first fragment. In this way, sending fragments of the parameter set in different NAL units may increase error resiliency in the sense that any received fragment of the parameter set may still be useful, as it is still decodable by the decoder, regardless of whether other fragments of the parameter set are received, corrupted, or lost in transmission.

In some examples, video encoder 20 may signal quantization matrices in a parameter set by signaling differences between the quantization matrices. Consequently, video decoder 30 may reconstruct (i.e., predict) a quantization matrix by adding a difference signaled for the quantization matrix to another quantization matrix. In some examples, video decoder 30 may reconstruct a quantization matrix by interpolating the values of the quantization matrix from one or more other quantization matrices or from a subset of values signaled for the quantization matrix.

However, in some examples, video encoder 20 may select prediction modes for the quantization matrices such that the quantization matrices in one fragment of a parameter set are not dependent on the quantization matrices in another fragment of the parameter set. For example, a first NAL unit may include a first subset of the quantization matrices and a second NAL unit includes a second subset of the quantization matrices. In this example, video encoder 20 may select prediction modes for the quantization matrices such that each quantization matrix in the first subset of quantization matrices may be determinable without reference to data in the second NAL unit and each quantization matrix in the second subset of quantization matrices may be determinable without reference to data in the first NAL unit. For instance, in this example, there may be no differential coding between quantization matrices in different fragments of the parameter set.

In some examples where a parameter set includes a set of quantization matrices, each NAL unit that contains a fragment of the parameter set may include one or more syntax elements that indicate allowed types of quantization matrix prediction. Furthermore, in some examples where a parameter set includes a set of quantization matrices, a NAL unit that includes a fragment of a parameter set may include a syntax element that specifies that the fragment does not contain all of the quantization matrices of the parameter set.

Figure 2:
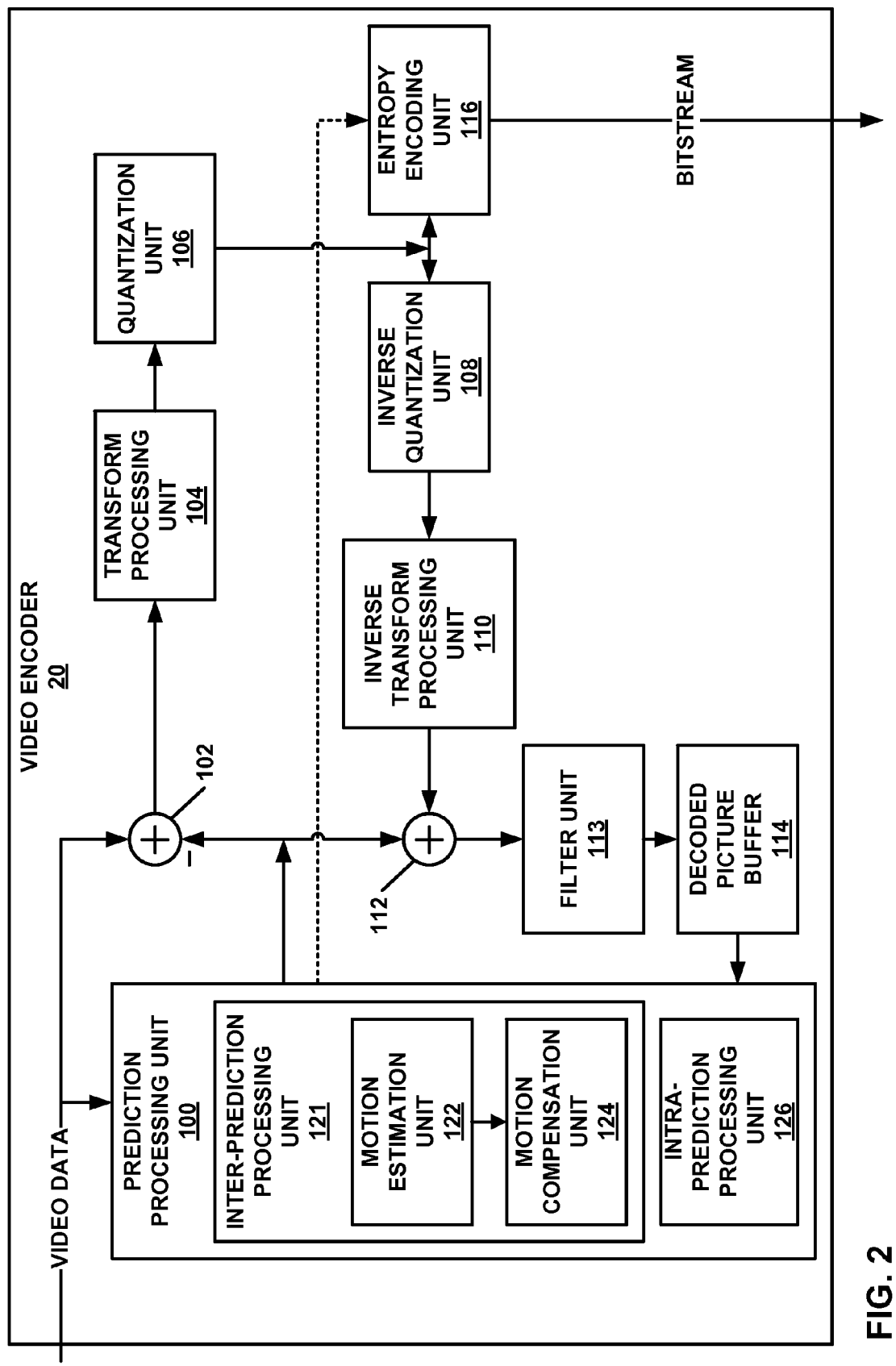
FIG. 2 is a block diagram illustrating an example video encoder that may implement one or more of the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121, a motion estimation unit 122, a motion compensation unit 124, and an intra-prediction processing unit 126. In other examples, video encoder 20 may include more, fewer, or different functional components. Furthermore, motion estimation unit 122 and motion compensation unit 124 may be highly integrated, but are represented in the example of FIG. 2 separately for purposes of explanation. In addition, although not shown in the example of FIG. 2, video encoder 20 may, in some examples, include a component that generates NAL units based on data generated by other functional components of video encoder 20.

Video encoder 20 may encode pictures. As part of encoding a picture, video encoder 20 may encode each slice of the picture. As part of encoding a slice, video encoder 20 may encode tree blocks in the slice.

Video encoder 20 may encode the tree blocks of the slice according to a raster scan order. In other words, video encoder 20 may encode the tree blocks of the slice in an order that proceeds from left to right across a topmost row of tree blocks in the slice, then proceeds from left to right across a next lower row of tree blocks, and so on until video encoder 20 has encoded each of the tree blocks of the slice.

As a result of encoding the tree blocks according to the raster scan order, the tree blocks above and to the left of a given tree block may have been encoded, but tree blocks below and to the right of the given tree block have not yet been encoded. Consequently, video encoder 20 may be able to access information generated by encoding tree blocks above and to the left of the given tree block when encoding the given tree block. However, video encoder 20 may be unable to access information generated by encoding tree blocks below and to the right of the given tree block when encoding the given tree block.

As part of encoding a tree block, prediction processing unit 100 may perform quad-tree partitioning on the video block of the tree block to divide the video block into progressively smaller video blocks. Each of the smaller video blocks may be associated with a different CU. For example, prediction processing unit 100 may partition a video block of a tree block into four equally-sized sub-blocks, partition one or more of the sub-blocks into four equally-sized sub-sub-blocks, and so on.

The sizes of the video blocks associated with CUs may range from 8×8 samples up to the size of the tree block with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block has N samples in a vertical direction and N samples in a horizontal direction, where N represents a nonnegative integer value.

Furthermore, as part of encoding a tree block, prediction processing unit 100 may generate a hierarchical quad-tree data structure for the tree block. For example, a tree block may correspond to a root node of the quad-tree data structure. If prediction processing unit 100 partitions the video block of the tree block into four sub-blocks, the root node has four child nodes in the quad-tree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quad-tree data structure may contain syntax data (e.g., syntax elements) for the corresponding tree block or CU. For example, a node in the quad-tree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quad-tree data structure. A coded tree block may include data based on the quad-tree data structure for a corresponding tree block.

Video encoder 20 may encode CUs of a tree block to generate encoded representations of the CUs (i.e., coded CUs). Video encoder 20 may encode the CUs of a tree block according to a z-scan order. In other words, video encoder 20 may encode a top-left CU, a top-right CU, a bottom-left CU, and then a bottom-right CU, in that order. When video encoder 20 encodes a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a tree block according to a z-scan order, the CUs above, above-and-to-the-left, above-and-to-the-right, left, and below-and-to-the left of a given CU may have been encoded. CUs below or to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

As part encoding a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may perform inter prediction on each PU of the CU. Inter prediction may provide temporal compression. Inter-prediction processing unit 121 may generate predictive data for a PU. The predictive data for the PU may include a predictive video block that corresponds to the PU and motion information for the PU. Motion estimation unit 122 may generate the motion information for the PU. In some instances, motion estimation unit 122 may use merge mode or advanced motion vector prediction (AMVP) mode to signal the motion information of the PU. Motion compensation unit 124 may generate the predictive video block of the PU based on samples of one or more pictures other than the current picture (i.e., reference pictures).

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." In some examples, each reference picture listed in list 0 occurs before the current picture in display order. Each of the reference pictures in list 0 contains samples that may be used for inter prediction of other pictures. Motion estimation unit 122 may search the reference pictures in list 0 for a reference block for a PU in a P slice. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

Motion estimation unit 122 may generate a reference picture index that indicates the reference picture in list 0 containing a reference block of a PU in a P slice and a motion vector that indicates a spatial displacement between the PU and the reference block. Motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference picture index and the motion vector as the motion information of the PU. Motion compensation unit 124 may generate a predictive video block of the PU based on the reference block associated with the motion information of the PU.

If the PU is in a B slice of a picture, the picture containing the PU may be associated with two lists of reference pictures, referred to as "list 0" and "list 1." In some examples, each reference picture listed in list 1 occurs after the picture in display order.

Furthermore, if the PU is in a B slice, motion estimation unit 122 may perform uni-directional inter prediction or bi-directional inter prediction for the PU. To perform uni-directional inter prediction for the PU, motion estimation unit 122 may search the reference pictures of list 0 or list 1 for a reference block for the PU. Motion estimation unit 122 may generate a reference picture index that indicates the reference picture in list 0 or list 1 that contains the reference block and a motion vector that indicates a spatial displacement between the PU and the reference block. In addition, motion estimation unit 122 may generate a prediction direction indicator that indicates whether the reference block is in a reference picture that is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate the reference pictures in list 0 and list 1 containing the reference blocks and motion vectors that indicate spatial displacements between the reference blocks and the PU. The motion information of the PU may include the reference picture indexes and the motion vectors of the PU. Motion compensation unit 124 may generate the predictive video block of the PU based on the reference blocks indicated by the motion information of the PU.

Intra-prediction processing unit 126 may perform intra prediction on PUs. Intra prediction may provide spatial compression. Intra-prediction processing unit 126 may generate predictive data for a PU based on decoded samples in the same picture as the PU. The predictive data for the PU may include a predictive video block and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from video blocks of neighboring PUs across the video block of the PU in a direction and/or gradient associated with the intra prediction mode. The neighboring PUs may be above, above and to the right, above and to the left, and/or to the left of the PU, assuming a left-to-right, top-to-bottom encoding order for PUs, CUs, and tree blocks. Intra-prediction processing unit 126 may use various numbers of intra prediction modes, e.g., 33 directional intra prediction modes. In some examples, the number of intra prediction modes may depend on the size of the PU.

Prediction processing unit 100 may select the predictive data for a PU from among the predictive data generated by inter-prediction unit 121 for the PU or the predictive data generated by intra-prediction processing unit 126 for the PU. In some examples, prediction processing unit 100 selects the predictive data for the PU based on rate/distortion metrics of the sets of predictive data.

Residual generation unit 102 may generate residual data for a CU by subtracting predictive video blocks of PUs of the CU from the video block of the CU. The residual data of a CU may include residual video blocks that correspond to different sample components of the samples in the video block of the CU. For example, the residual data may include a residual video block that corresponds to differences between luminance components of samples in the predictive video blocks of the PUs of the CU and luminance components of samples in the original video block of the CU. In addition, the residual data of the CU may include residual video blocks that correspond to the differences between chrominance components of samples in the predictive video blocks of the PUs of the CU and the chrominance components of the samples in the original video block of the CU.

Prediction processing unit 100 may perform quad-tree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quad-tree structure known as a "residual quad-tree" (RQT) may include nodes associated with each of the residual video blocks. The TUs of a CU may correspond to leaf nodes of the RQT.

Transform processing unit 104 may generate one or more coefficient blocks for each TU of a CU by applying one or more transforms to a residual video block associated with the TUs. Each of the coefficient blocks may be a 2D matrix of coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

Quantization unit 106 may quantize the coefficients in a coefficient block associated with a TU of a CU. The quantization process may reduce the bit depth associated with some or all of the coefficients. For example, an n-bit coefficient may be rounded down to an m-bit coefficient during quantization, where n is greater than m. Quantization unit 106 may use a quantization matrix, in conjunction with a QP value associated with a CU, to quantize a coefficient block associated with a TU of the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to the coefficient block, respectively, to reconstruct a residual video block from the coefficient block. Reconstruction unit 112 may add the reconstructed residual video block to corresponding samples from one or more predictive video blocks generated by prediction processing unit 100 to produce a reconstructed video block associated with a TU. By reconstructing video blocks for each TU of a CU in this way, video encoder 20 may reconstruct the video block of the CU.

Filter unit 113 may perform a deblocking operation to reduce blocking artifacts in a video block associated with a CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra-prediction processing unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy-encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

As described above, video encoder 20 may generate a bitstream that includes a series of NAL units. Each of the NAL units may include a NAL unit header and a raw byte sequence payload (RBSP). The NAL unit headers of NAL units may include syntax elements (nal_unit_type) that indicate the types of the NAL units. A RBSP may be a syntax structure containing an integer number of bytes that is encapsulated within a NAL unit. A RBSP may either be empty or may have the form of a string of data containing syntax elements followed by an RBSP stop bit and followed by zero or more subsequent bits equal to 0. Different types of NAL units include different types of RBSPs. Different types of RBSPs contain different types of coded video data.

For example, a coded slice NAL unit may include an RBSP that contains coded syntax elements associated with a slice. The coded syntax elements associated with a slice may include syntax elements that video decoder 30 may use to determine quantized coefficients of video blocks in the slice, syntax elements that video decoder 30 may use to determine motion information of inter-predicted PUs of the slice, intra-prediction coding modes, and so on. Furthermore, a parameter set NAL unit may include an RBSP that contains data of a parameter set. Example types of parameter set NAL units include PPS NAL units, SPS NAL units, APS NAL units, and other types of NAL units that contain parameter sets. A PPS NAL unit is a NAL unit that contains an RBSP that includes data of a PPS. A SPS NAL unit is a NAL unit that contains an RBSP that includes data of a SPS. An APS NAL unit is a NAL unit that contains an RBSP that includes data of an APS.

In accordance with the techniques of this disclosure, video encoder 20 may generate NAL units that contain RBSPs that include data of fragments of a parameter set. The RBSPs that include data of fragments of a parameter set may conform to various syntaxes. For example, an RBSP of an APS NAL unit may conform to the syntax of Table 1, below. Although the examples below are explained with reference to an APS NAL unit, the techniques of this disclosure may be applicable to other types of parameter sets, such as PPSs and SPSs.

TABLE 1

Adaptation Parameter Set RBSP syntax

| aps_parameter_set_rbsp( ) { | Descriptor |
|---|---|
|   aps_parameter_set_id | ue(v) |
|   quantization_matrix_flag | u(1) |
|   if ( quantization_matrix_flag ) { | |
|     quantization_matrix_idc | u(2) |
|     qm_fragment_only_aps_flag | u(1) |
|   } | |
|   if ( !qm_fragment_only_aps_flag ) { | |
|     // everything except quantization | |
|     // matrix, such as sample adaptive offset (SAO), | |
|     // adaptive loop filter (ALF), etc. | |
|     ... | |
|   } | |
|   if ( quantization_matrix_flag ) | |
|     quantization_matrix_table( ) | |
|   rbsp_trailing_bits( ) | |
| } | |

In the example syntax of Table 1, the aps_parameter_set_id parameter specifies a value that serves as an identifier of the APS. The APS NAL units with the same value of the aps_parameter_set_id syntax element belong to a same APS.

The quantization_matrix_flag syntax element, in the example syntax of Table 1, specifies whether quantization matrices are signaled in the APS. If the quantization_matrix_flag syntax element is equal to 0, quantization matrices are not signaled in the current APS and are not used for coded pictures that refer to the current APS. If the quantization_matrix_flag syntax element is equal to 1, quantization matrices are signaled in the current APS and are used for coded pictures referring to the current APS. In this way, a parameter set NAL unit may include a flag that indicates that the parameter set NAL unit includes one or more quantization matrices.

Furthermore, in the example syntax of Table 1, the quantization_matrix_idc syntax element specifies the types of quantization matrix prediction that are allowed. If the quantization_matrix_idc syntax element is equal to 0, only quantization matrix prediction within a quantization matrix is allowed. If the quantization_matrix_idc syntax element is equal to 1, quantization matrix coefficient prediction within the same parameter set NAL unit, both within a matrix or across matrices, is allowed. If the quantization_matrix_idc syntax element is equal to 2, quantization matrix prediction within the same parameter set, with a quantization matrix, across quantization matrices but within one NAL unit, or across quantization matrices in different NAL units of the same parameter set, is allowed. If the quantization_matrix_idc syntax element is equal to 3, prediction of a quantization matrix from within a quantization matrix, from other quantization matrices in the same parameter set NAL unit, from other quantization matrices from different NAL units of the same parameter set, and from other quantization matrices in different parameter sets are all allowed. In instances where the quantization_matrix_idc syntax element is equal to 0 or 1, segments of the APS may be decodable independently. That is, if the quantization_matrix_idc syntax element is equal to 0 or 1, each segment of the parameter set may be decoded without reference to any other segment of the parameter set.

In the example syntax of Table 1, if the qm_fragment_only_aps_flag syntax element is equal to 1, the current APS NAL unit may contain only a matrix table, not other syntax elements, such as Sample Adaptive Offset (SAO)- and Adaptive Loop Filter (ALF)-related syntax elements. If the qm_fragment_only_aps_flag syntax element is equal to 0, the current APS NAL unit may contain both quantization matrices and other syntax elements, such as SAO and ALF related syntax elements. When not present, the qm_fragment_only_aps_flag syntax element is inferred to be equal to 0. In this way, a parameter set NAL unit may include a flag that indicates whether the parameter set NAL unit contains all of the quantization matrices of a parameter set.

The example syntax of Table 1 includes a quantization_matrix_table syntax structure. The quantization_matrix_table syntax structure may conform to the example syntax of Table 2, below.

TABLE 2

Quantization matrix table syntax

| quantization_matrix_table( ) { | Descriptor |
|---|---|
|   reuse_qm_tabe_flag | u(1) |
|   if ( reuse_qm_tabe_flag ) | |
|     reused_aps_id | |
|   else{ | |
|     fragment_flag | u(1) |
|     if ( fragment_flag ) | |
|       num_quantization_matrices | u(5) |
|     if ( quantization_matrix_idc = = 3 ) { | |
|       num_ref_aps_for_qm | ue(v) |
|       for(i=0; i< num_ref_aps_for_qm; i++ ) | |
|         ref_aps_id[ i ] | ue(v) |
|     } | |
|     for (i=0; i < num_quantization_matrices ; i++) { | |
|       quan_matrix_id[ i ] | ue(v) |
|       if ( quantization_matrix_idc > 0 ) | |
|         qm_prediction_mode[ i ] | u(v) |
|       if ( qm_prediction_mode = = 3 ) { | |
|         ref_aps_idx[ i ] | ue(v) |
|       if ( qm_prediction_mode > 0 ) { | |
|         qm_id[ i ] | ue(v) |
|         qm_pred_skip_flag[ i ] | u(1) |
|       } | |
|       if (! qm_pred_skip_flag ) | |
|         quantization_matrix_coefs( i ) | |
|     } | |
|   } | |
| } | |

The quantization_matrix_table syntax structure of Table 2 may contain the quantization matrices signaled in one APS NAL unit. As indicated above, each of the NAL units with the same value of the aps_parameter_set_id syntax element may belong to a same APS. The NAL units belonging to the same APS may together contain one full set of twenty-four quantization matrices.

In the example syntax of Table 2, if the reuse_qm_tabe_flag syntax element is equal to 1, video decoder 30 may determine that quantization matrices of the current APS are the same as the quantization matrices of another APS. The reused_aps_id syntax element specifies an identifier of the other APS. If the reuse_qm_tabe_flag syntax element is equal to 0, the quantization matrices of the current APS are signaled in the remaining part of the quantization matrix table.

Furthermore, in the example of Table 2, if the fragment_flag syntax element is equal to 1, the quantization matrix table does not contain all the quantization matrices of the current APS. If the fragment_flag syntax element is equal to 0, the quantization matrix table contains all the quantization matrices of the current APS. When the fragment_flag syntax element is not present, the fragment_flag syntax element is inferred to be equal to 0.

In the example syntax of Table 2, the num_quantization_matrices syntax element specifies the number of quantization matrices signaled in this quantization matrix table. When the num_quantization_matrices syntax element is not present, the number of quantization matrices signaled in this quantization matrix table may be inferred to be equal to twenty-four. The num_ref_aps_for_qm syntax element specifies the number of reference APSs used to predict the quantization matrices defined in this quantization matrix table. The ref_aps_id[i] syntax element specifies the identifier of the i-th reference APS used to predict the quantization matrices defined in this quantization matrix table. The quan_matrix_id[i] syntax element specifies the identifier of the i-th quantization matrix signaled in this quantization matrix table.

The qm_prediction_mode[i], in the example syntax of Table 2, specifies the prediction mode of the i-th quantization matrix. When the quantization_matrix_idc syntax element is equal to 1, the length of the qm_prediction_mode[i] syntax element may be one bit. If the quantization_matrix_idc syntax element is equal to 2 or 3, the length of the quantization_matrix_idc[i] syntax element may be two bits. If the qm_prediction_mode[i] syntax element is equal to 0, quantization matrix prediction within the i-th quantization matrix itself is allowed. If the qm_prediction_mode[i] syntax element is equal to 1, the i-th quantization matrix is predicted from a quantization matrix in the same APS NAL Unit. If the qm_prediction_mode[i] syntax element is equal to 2, the i-th quantization matrix is predicted from a quantization matrix of the same APS. If the qm_prediction_mode[i] syntax element is equal to 3, the i-th quantization matrix is predicted from a quantization matrix of a different APS.

Thus, if the qm_prediction_mode[i] syntax element is greater than 0, the i-th quantization matrix may be predicted from another quantization matrix indicated by the qm_id[i] syntax element. Video encoder 20 may form a prediction error between the i-th quantization matrix and the predicted quantization matrix. The prediction error may indicate the differences between the i-th quantization matrix and the predicted quantization matrix. Video encoder 20 may encode the prediction error using a zig-zag scan followed by signed exponential Golomb codes or other variable length codes. If the other quantization matrix is smaller than the i-th quantization matrix in either dimension, video encoder 20 may use linear interpolation or another interpolation method to form the predicted quantization matrix.

If the other quantization matrix is larger in size in either dimension than the i-th quantization matrix (i.e., the current quantization matrix), video encoder 20 may derive the predicted quantization matrix as follows. Let the current quantization matrix be Q1 and be of size N×N. Furthermore, let the other quantization matrix be Q2 and be of size kN×kN. Also, let the predicted quantization matrix be PQ and be of size N×N. k may be an integer that is a power of 2. In this example, video encoder 20 may form PQ(i,j) by averaging the samples of Q2 in a window of size (2m+1)×(2m+1), centered around Q2(ki,kj). Video encoder 20 may round the average to the nearest pixel. In some examples, video encoder 20 may assign weights to the samples inside the window differently.

In another example, when the qm_prediction_mode[i] syntax element is 0, video encoder 20 may perform a spatial prediction on the quantization matrix coefficients with a particular scan, such as a zig-zag scan or a raster scan. Video encoder 20 may encode the prediction error using Golomb coding, exponential Golomb coding, or other variable-length codes. The encoding of quantization matrix parameters may be lossy. The decoding process for quantization matrixes may be the same regardless of whether video encoder 20 uses lossy or lossless encoding.

Furthermore, in the example syntax of Table 2, the ref_aps_idx[i] syntax element specifies an index to the list of APSs identified by the ref_aps_id[j] syntax element for all j values in the range of 0 to num_ref_aps_for_qm−1, inclusive. The qm_id[i] syntax element specifies the identifier of the quantization matrix signaled in the APS identified by the ref_aps_idx[i] syntax element that is used to predict the i-th quantization matrix of the current APS. If the qm_pred_skip_flag[i] syntax element is equal to 1, the i-th quantization matrix is predicted and no coefficients are signaled to refine the predicted quantization matrix. If the qm_pred_skip_flag[i] syntax element is equal to 0, coefficients of the i-th quantization matrix are signaled in the quantisation_matrix_coefs syntax table. The qm_pred_skip_flag[i] syntax element is inferred to be equal to 0 when not present.

In another example, the RBSP of an APS may conform to the example syntax shown in Table 3, below.

TABLE 3

APS RBSP

| aps_rbsp( ) { | Descriptor |
|---|---|
|   aps_id | ue(v) |
|   first_aps_fragment_flag | u(1) |
|   last_aps_fragment_flag | u(1) |
|   if( first_aps_fragment_flag ) { | |
|     aps_quantization_matrix_flag | u(1) |
|     aps_sample_adaptive_offset_flag | u(1) |
|     aps_adaptive_loop_filter_flag | u(1) |
|     ... | |
|     //flags for presence of other types of | |
|     // information in the APS | |
|   } | |
|   if( aps_quantization_matrix_flag ) { | |
|     if( !( first_aps_fragment_flag | |
|     && last_aps_fragment_flag ) | |
|       num_quantization_matrices_minus1 | ue(v) |
|     for( i = 0; i <= | |
|     num_quantization_matrices_minus1; i++ ) | |
|       quantization_matrix_coefs( i ) | |
|   } | |
|   if( more_rbsp_data( ) ) { | |
|   ...// everything else than quantization matrix, e.g. SAO and ALF information | |
|   } | |
|   rbsp_trailing_bits( ) | |
| } | |

In the example syntax of Table 3, the aps_id syntax element specifies the identifier of the APS. There may be more than one APS NAL unit associated with one APS. Each of the APS NAL units that contains a fragment of the same APS may specify the same value of the aps_id syntax element.

Furthermore, in the example syntax of Table 3, if the first_aps_fragment_flag syntax element is equal to 1, the APS NAL unit is the first APS NAL unit of the APS identified by the aps_id syntax element. If the first_aps_fragment_flag syntax element is equal to 0, the APS NAL unit is not the first APS NAL unit of the APS identified by the aps_id syntax element. The first APS NAL unit, identified by the first_aps_fragment_flag syntax element being equal to 1, contains "header" syntax elements, e.g., flags indicating the presence of different types of information, as well other types of information included in the APS, such as ALF and SAO related information. In the example syntax of Table 3, other APS NAL units of one APS only contain quantization matrix information. In other examples, it may also be possible for the other APS NAL units to contain other types of information.

In the example syntax of Table 3, if the last_aps_fragment_flag syntax element is equal to 1, the APS NAL unit is the last APS NAL unit of the APS identified by the aps_id syntax element. If the last_aps_fragment_flag syntax element is equal to 0, the APS NAL unit is not the last APS NAL unit of the APS identified by the aps_id syntax element. If the first_aps_fragment_flag syntax element and the last_aps_fragment_flag syntax element are both equal to 1, the APS identified by the aps_id syntax element contains only one APS fragment.

The aps_quantization_matrix_flag syntax element, in the example syntax of Table 3, specifies whether quantization matrices are signaled in the current APS. If the aps_quantization_matrix_flag syntax element is equal to 0, the quantization matrices are not signaled in the current APS and are not used for coded pictures referring to the current APS. If the aps_quantization_matrix_flag syntax element is equal to 1, quantization matrices are signaled in the current APS and are used for coded pictures referring to the current APS. If the aps_quantization_matrix_flag syntax element is not present (i.e., the first_aps_fragment_flag syntax element is equal to 0), the aps_quantization_matrix_flag syntax element may be inferred to be equal to 1.

In the example syntax of Table 3, if the aps_sample_adaptive_offset_flag syntax element is equal to 1, SAO is applied for slices that refer to the current APS. If the aps_sample_adaptive_offset_flag syntax element is equal to 0, SAO is not applied for slices that refer to the current APS. If there is no active APS, the aps_sample_adaptive_offset_flag syntax element may be inferred to be 0. An active APS may be an APS referred to by a slice that is currently being coded. If the aps_adaptive_loop_filter_flag syntax element is equal to 1, the ALF is applied to slices that refer to the current APS. If the aps_adaptive_loop_filter_flag syntax element is equal to 0, the ALF is not applied to slices that refer to the current APS. If there is no active APS, the aps_adaptive_loop_filter_flag syntax element may be inferred to be 0.

Furthermore, the num_quantization_matrices_minus1 syntax element, plus 1, specifies the number of quantization matrices signaled in the current APS NAL unit. If the num_quantization_matrices_minus1 syntax element is not present, the value of the num_quantization_matrices_minus1 syntax element may be inferred to be equal to twenty-three.

In some examples, the element "if(more_rbsp_data( ))" of Table 3 is replaced with "if(first_aps_fragment_flag)." In this way, only the first APS fragment may contain information other than quantization matrices. Furthermore, in some examples, prediction within one instance of quantization_matrix_coefs(i) or across different instances of quantization_matrix_coefs(i) within the same APS NAL unit is allowed. However, dependency across different APS NAL units is not allowed. This may ensure that any single received APS NAL unit is useful by itself, even if all other APS NAL units associated with the current APS are lost.

Table 4, below, illustrates another example syntax for quantization_matrix_table. In the example syntax of Table 4, the quantization matrix identifier of a first quantization matrix is signaled. However, because the quantization matrices follow a particular order, the quantization matrix identifiers of quantization matrices other than the first quantization matrix are not explicitly signaled.

TABLE 4

Quantization matrix table

| quantization_matrix_table ( ) { | Descriptor |
|---|---|
|   reuse_qm_tabe_flag | u(1) |
|   if ( reuse_qm_tabe_flag) | |
|     reused_aps_id | |
|   if (! reuse_qm_tabe_flag ) { | |
|     fragment_flag | u(1) |
|     if ( fragment_flag ) | |
|       num_quantization_matrices | u(5) |
|     if ( quantization_matrix_idc = = 3) { | |
|       num_ref_aps_for_qm | ue(v) |
|       for(i=0; i< num_ref_aps_for_qm; i++ ) | |
|         ref_aps_id[ i ] | ue(v) |
|     } | |
|     id_start | ue(v) |
|     for (i=0; i < num_quantization_matrices ; i++) { | |
|       if ( quantization_matrix_idc >1 ) | |
|         qm_prediction_mode[ i ] | u(v) |
|       if ( qm_prediction_mode = = 2) { | |
|         ref_aps_idx[ i ] | ue(v) |
|       if ( qm_prediction_mode > 0 ) { | |
|         qm_id[ i ] | ue(v) |
|         qm_pred_skip_flag[ i ] | u(1) |
|       } | |
|       if (! qm_pred_skip_flag[ i ] ) | |
|         quantisation_matrix_coefs( i ) | |
|     } | |
|   } | |
| } | |

In the example syntax of Table 4, the id_start syntax element specifies the identifier of the first quantization matrix signaled in this table. The signaled quantization matrices have identifiers ranging from the value specified by the id_start syntax element to a value equal to the value specified by the id_start syntax element plus the value specified by the num_quantization_matrices syntax element, minus 1. That is, the i-th quantization matrix has a quantization matrix identifier equal to the value specified by the id_start syntax element, plus i. The other syntax elements of Table 4 may have the same semantics as corresponding syntax elements in the example syntax of Table 2.

In the examples above, the quantization matrices may be signaled, in one or more parameter set NAL units, in a pre-defined order. In some examples, this pre-defined order may be a priority order in which more important quantization matrices are signaled earlier than less important quantization matrices. An index of a quantization matrix is the index to a position in a list of signaled quantization matrices.

For example, in one possible order of the quantization matrices, all the quantization matrices of size 4×4 are signaled first, followed by quantization matrices of size 8×8, followed by quantization matrices of size 16×16, and finally quantization matrices of size 32×32. Within a particular block size, the order may be quantization matrices for Y-intra coefficient blocks, quantization matrices for Y-inter coefficient blocks, quantization matrices for U-intra coefficient blocks, quantization matrices for V-intra coefficient blocks, quantization matrices for U-inter coefficient blocks, and quantization matrices for V-inter coefficient blocks.

A Y-intra coefficient block may be a coefficient block based on a predictive video block of Y (i.e., luminance) samples that was generated using intra prediction. A Y-inter coefficient block may be a coefficient block based on a predictive video block of Y (i.e., luminance) samples that was generated using inter prediction. A U-intra coefficient block may be a coefficient block based on a predictive video block of U (i.e., U-chrominance or Cb-chrominance) samples that was generated using intra prediction. A U-inter coefficient block may be a coefficient block based on a predictive video block of U samples that was generated using inter prediction. A V-intra coefficient block may be a coefficient block based on a predictive video block of V (i.e., V-chrominance or Cr-chrominance) samples that was generated using intra prediction. A U-inter coefficient block may be a coefficient block based on a predictive video block of V samples that was generated using inter prediction.

In another example, the quantization matrices may be listed in a different order. First, video encoder 20 may signal the luminance quantization matrices for all block sizes are sent in the following order: Y-intra-4×4, Y-inter-4×4, Y-intra-8×8, Y-inter-8×8, Y-intra-16×16, Y-inter-16×16, Y-intra-32×32, and Y-inter-32×32. These quantization matrices are followed by quantization matrices for U and V components. Chroma quantization matrices of size 4×4 are signaled first, followed by 8×8, 16×16, and 32×32. Within a particular block size, the order may be U-intra, V-intra, U-inter, V-inter. In some examples, video encoder 20 may output NAL units containing the quantization matrices in order such that this ordering of the quantization matrices is preserved.

Tables 1-4 above have described syntaxes of or within an APS. However, other types of parameter sets may include quantization matrices that conform to Tables 2 or 4, or other syntaxes. For example, SPSs or PPSs may include quantization matrices that conform to Tables 2 or 4, or other syntaxes. Moreover, the syntax element of APSs described above may be included in other types of parameter sets, such as SPSs and PPSs. Furthermore, in some examples, information can be repeatedly signaled in an SPS or PPS. Such information may include information that indicates whether quantization matrices are signaled and used, the types of prediction allowed, and so on.

Figure 3:
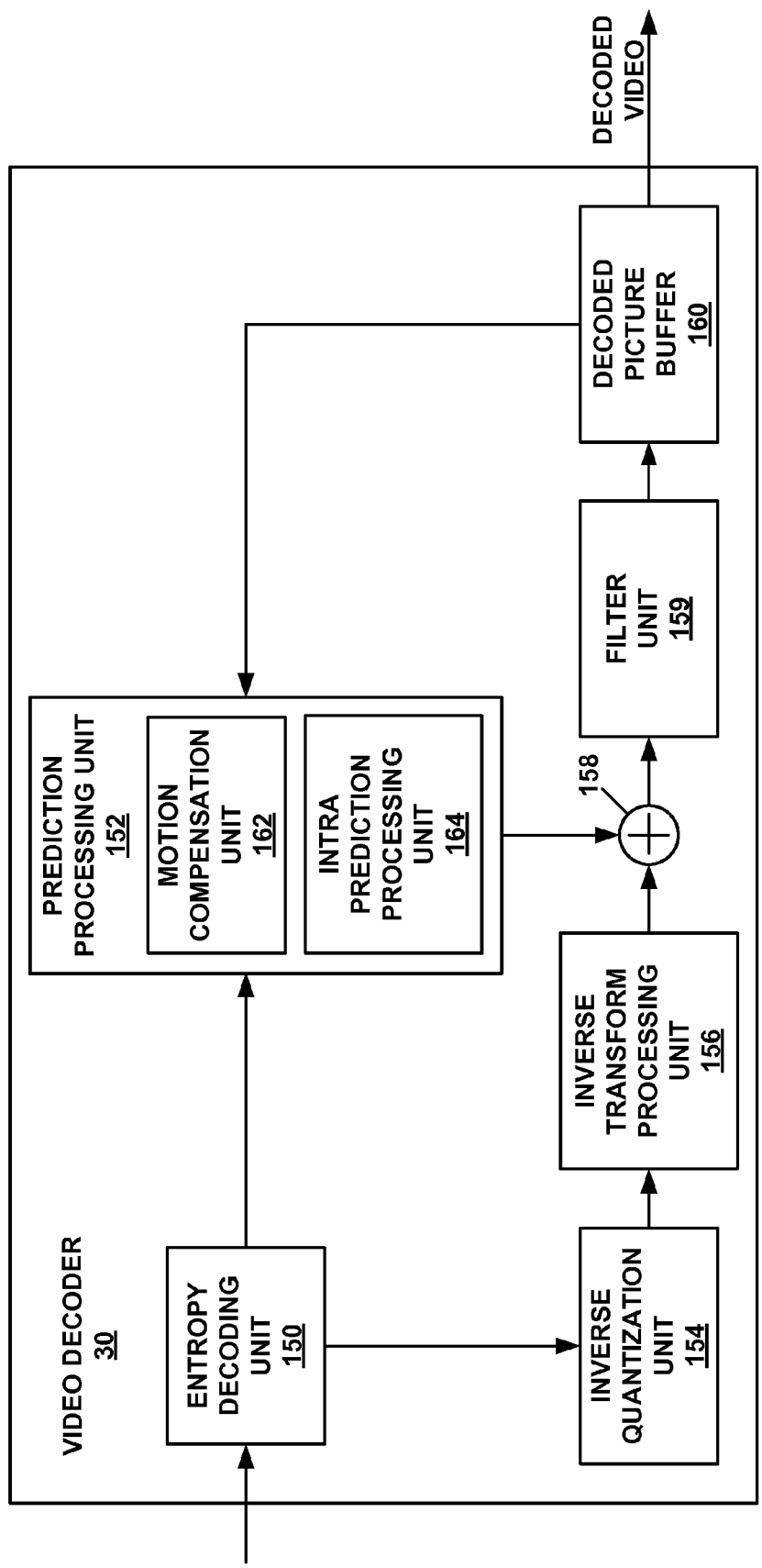
FIG. 3 is a block diagram illustrating an example video decoder that may implement one or more of the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream that comprises encoded video data. The bitstream may include a plurality of syntax elements. Entropy decoding unit 150 may parse the bitstream. As a result of parsing the bitstream, entropy decoding unit 150 may extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

As discussed above, the bitstream may comprise a series of NAL units. The NAL units of the bitstream may include coded slice NAL units, SPS NAL units, PPS NAL units, SEI NAL units, and so on. As part of parsing the bitstream, entropy decoding unit 150 may extract and entropy decode SPSs from SPS NAL units, PPSs from PPS NAL units, SEI data from SEI NAL units, and so on.

As part of parsing the bitstream, entropy decoding unit 150 may extract and entropy decode coded slices from coded slice NAL units in the bitstream. Each of the coded slices may include a slice header and slice data. The slice header may contain syntax elements pertaining to a slice. The syntax elements in the slice header may include a syntax element that identifies a PPS associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may extract syntax elements from coded CUs in the slice data. The extracted syntax elements may include syntax elements associated with coefficient blocks. Entropy decoding unit 150 may perform CABAC decoding operations on at least some of the syntax elements.

In addition, video decoder 30 may reconstruct residual video blocks associated with TUs of CUs. To reconstruct a residual video block of a TU, inverse quantization unit 154 may inverse quantize, i.e., de-quantize, a coefficient block associated with the TU. In some examples, inverse quantization unit 154 may use a quantization matrix and a QP value associated with a CU to inverse quantize a coefficient block associated with a TU of the CU. In some examples, the quantization matrix may be signaled in one or more parameter sets.

After inverse quantization unit 154 inverse quantizes a coefficient block, inverse transform processing unit 156 may apply one or more inverse transforms to the coefficient block in order to generate a residual video block for the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

In some examples, inverse transform processing unit 156 may determine an inverse transform to apply to the coefficient block based on signaling from video encoder 20. In such examples, inverse transform processing unit 156 may determine the inverse transform based on a signaled transform at the root node of a quad-tree for a tree block associated with the coefficient block. In other examples, inverse transform processing unit 156 may infer the inverse transform from one or more coding characteristics, such as block size, coding mode, or the like. In some examples, inverse transform processing unit 156 may apply a cascaded inverse transform.

If a PU is encoded in skip mode or motion information of the PU is encoded using merge mode, motion compensation unit 162 may generate a merge candidate list for the PU. Motion compensation unit 162 may identify a selected merge candidate in the merge candidate list. Motion compensation unit 162 may generate a predictive video block for the PU based on the one or more reference blocks associated with the motion information indicated by the selected merge candidate.

If motion information of a PU is encoded using AMVP mode, motion compensation unit 162 may generate a list 0 MV predictor candidate list and/or a list 1 MV predictor candidate list. Motion compensation unit 162 may determine a selected list 0 MV predictor candidate and/or a selected list 1 MV predictor candidate. Next, motion compensation unit 162 may determine a list 0 motion vector for the PU and/or a list 1 motion vector for the PU based on a list 0 motion vector difference (MVD), a list 1 MVD, a list 0 motion vector specified by the selected list 0 MV predictor candidate, and/or a list 1 motion vector specified by the selected list 1 MV predictor candidate. Motion compensation unit 162 may generate a predictive video block for the PU based on reference blocks associated with the list 0 motion vector and a list 0 reference picture index and/or a list 1 motion vector and a list 1 reference picture index.

In some examples, motion compensation unit 162 may refine the predictive video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predictive video block of the PU to calculate interpolated values for sub-integer samples of a reference block. Motion compensation unit 162 may determine the interpolation filters used by video encoder 20 according to received syntax information and use the interpolation filters to produce the predictive video block.

If a PU is encoded using intra prediction, intra-prediction processing unit 164 may perform intra prediction to generate a predictive video block for the PU. For example, intra-prediction processing unit 164 may determine an intra prediction mode for the PU based on syntax elements in the bitstream.

Reconstruction unit 158 may use the residual video blocks associated with TUs of a CU and the predictive video blocks of the PUs of the CU to reconstruct the video block of the CU. For example, reconstruction unit 158 may add samples in the residual video blocks to corresponding samples in the predictive video blocks to reconstruct the Y, Cb, and Cr video block of the CU.

Filter unit 159 may perform a deblocking operation to reduce blocking artifacts in the video blocks associated with the CU. Decoded picture buffer 160 may store the video blocks associated with the CU. Decoded picture buffer 160 may provide reference pictures for subsequent motion compensation, intra prediction, and presentation on a display device, such as display device 32 of FIG. 1. For instance, prediction processing unit 152 may perform, based on the video blocks in decoded picture buffer 160, intra prediction or inter prediction operations on PUs of other CUs.

Figure 4:
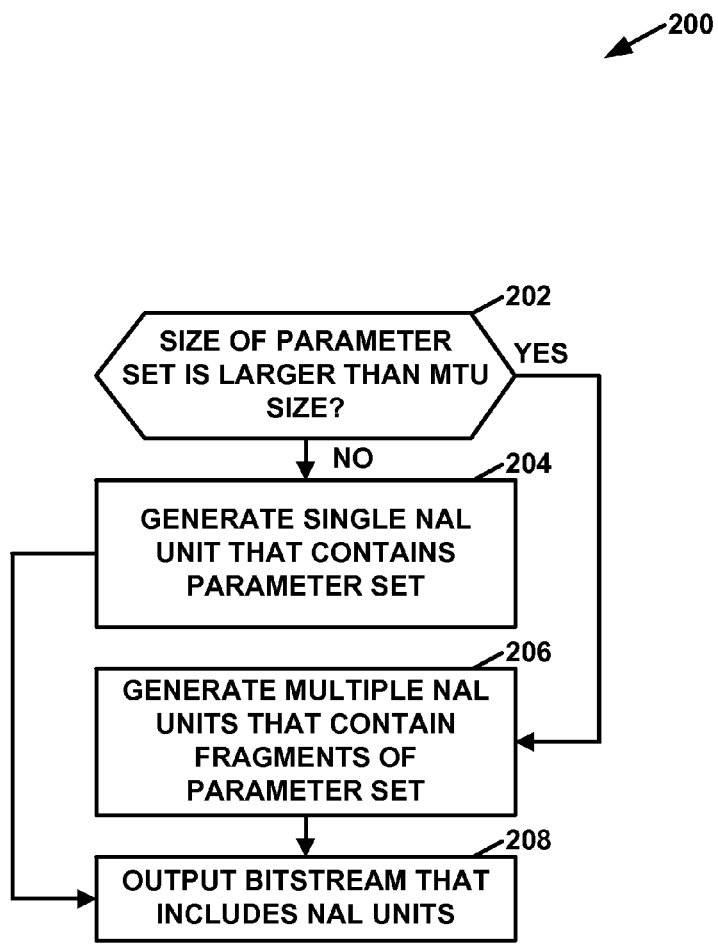
FIG. 4 is a flowchart that illustrates an example operation of a video encoder, in accordance with one or more techniques of this disclosure.

FIG. 4 is a flowchart that illustrates an example operation 200 of video encoder 20, in accordance with one or more techniques of this disclosure. In operation 200, video encoder 20 may determine whether a size of a NAL unit that contains a parameter set would be larger than an MTU size (202). In response to determining that the size of the NAL unit containing the parameter set would not be larger than the MTU size ("NO" of 202), video encoder 20 may generate a single NAL unit that contains the parameter set (204).

Figure 5:
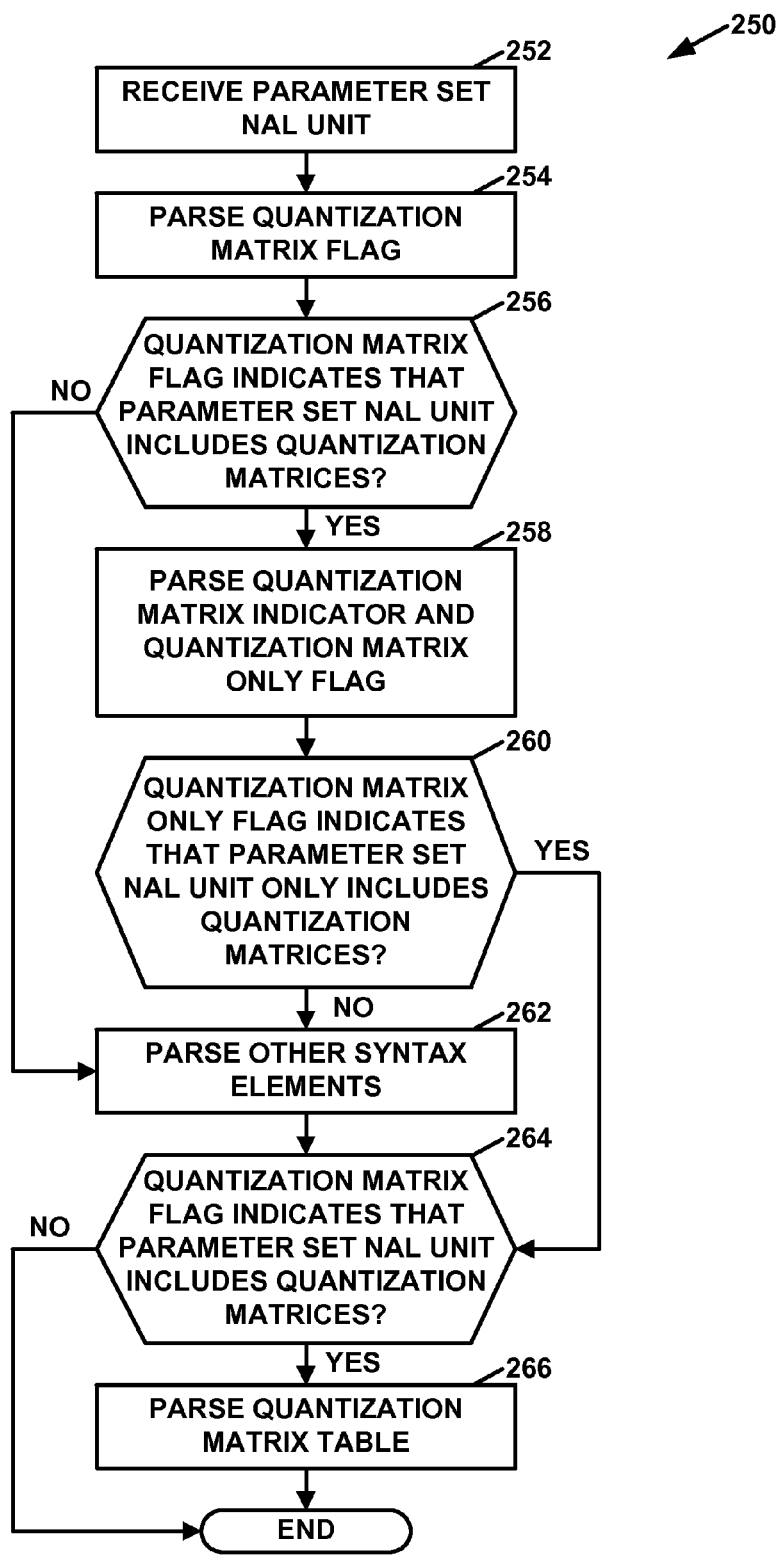
FIG. 5 is a flowchart that illustrates an example operation of a video decoder to parse a parameter set NAL unit, in accordance with one or more techniques of this disclosure.
Figure 6:
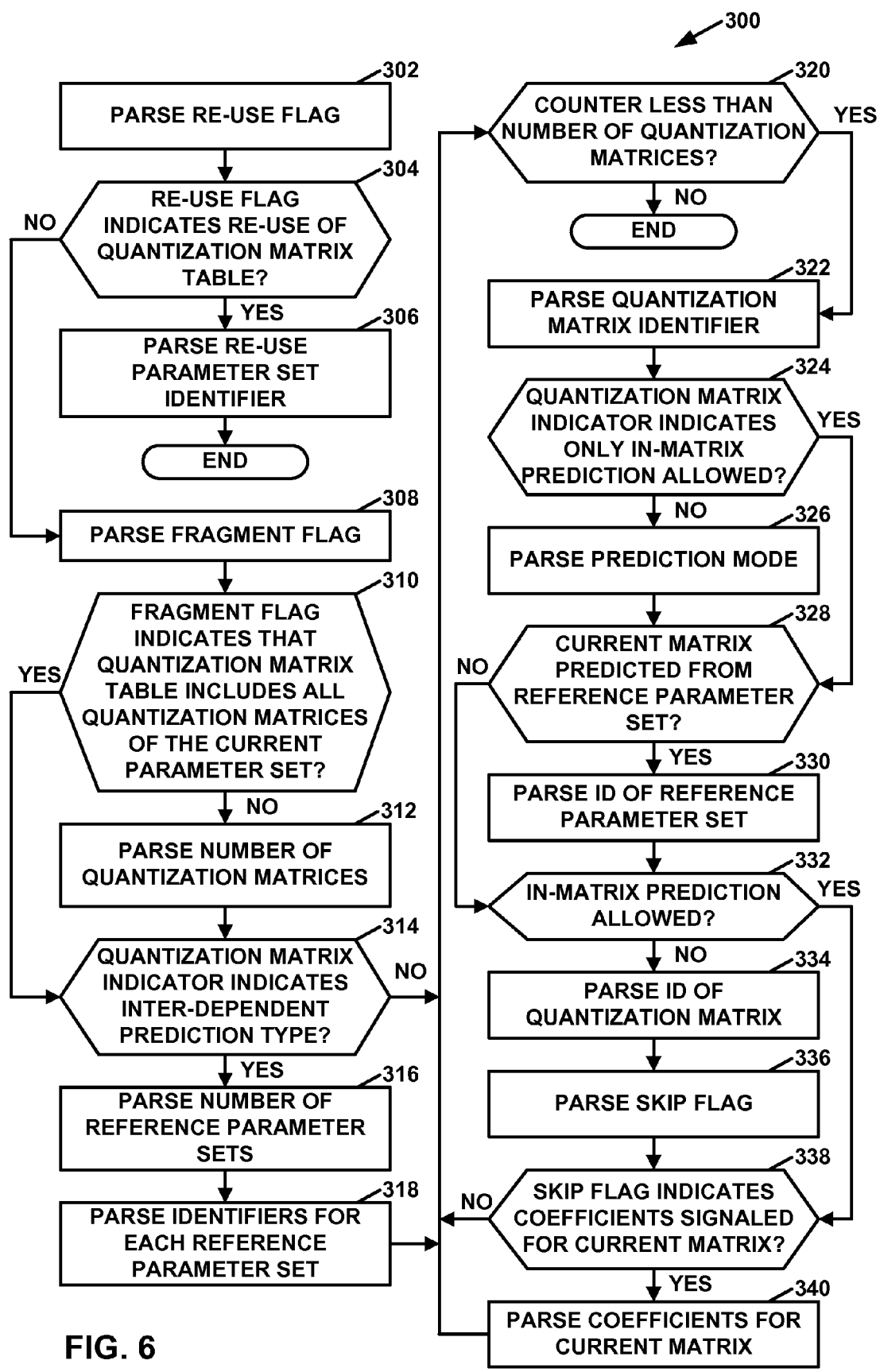
FIG. 6 is a flowchart that illustrates an example operation of the video decoder to parse a quantization matrix table in a parameter set NAL unit, in accordance with one or more techniques of this disclosure.

On the other hand, in response to determining that the size of a NAL unit that contains the parameter set would be larger than the MTU size ("YES" of 202), video encoder 20 may generate multiple (i.e., two or more) NAL units that contain fragments of the parameter set (206). FIGS. 5 and 6, described below, are flowcharts that describe example operations for parsing NAL units that contain fragments of parameter sets. Video encoder 20 may generate the fragments such that video decoder 30 may parse the fragments in accordance with the example operations of FIGS. 5 and 6.

Video encoder 20 may output a bitstream that includes a series of NAL units (208). The NAL units in the bitstream may include the NAL unit generated in action 204 or the multiple NAL units generated in action 206. In this manner, video encoder 20 generates a bitstream in which at least some NAL units include fragments of parameter sets, rather than entire parameter sets. Furthermore, in contrast to a system in which a NAL unit is split into packets at arbitrary points, video encoder 20 may generate the fragments such that the fragments may be independently decodable.

FIG. 5 is a flowchart that illustrates an example operation 250 of video decoder 30 to parse a parameter set NAL unit, in accordance with one or more techniques of this disclosure. In operation 250, video decoder 30 may receive a parameter set NAL unit (252). The parameter set NAL unit may be a SPS NAL unit, a PPS NAL unit, an APS NAL unit or a NAL unit that includes another type of parameter set. The parameter set NAL unit may include a complete parameter set or a fragment of a parameter set. Video decoder 30 may receive the parameter set NAL unit from channel 16 (FIG. 1), from a computer-readable storage medium, or from another source.

Video decoder 30 may parse a quantization matrix flag (quantization_matrix_flag) from the parameter set NAL unit (254). The quantization matrix flag may indicate whether quantization matrices are specified in the parameter set. Video decoder 30 may determine whether the quantization matrix flag indicates that the parameter set NAL unit includes quantization matrices (256).

In response to determining that the quantization matrix flag indicates that the parameter set NAL unit includes quantization matrices ("YES" of 256), video decoder 30 may parse a quantization matrix indicator (quantization_matrix_idc) and a quantization matrix-only flag (qm_fragment_only_aps_flag) from the parameter set NAL unit (258). Video decoder 30 may determine whether the quantization matrix-only flag indicates that the parameter set NAL unit only includes quantization matrices (260). In response to determining that the quantization matrix-only flag indicates that the parameter set NAL unit does not only include quantization matrices ("NO" of 260) or in response to determining that the quantization matrix flag indicates that the parameter set NAL unit includes quantization matrices ("NO" of 256), video decoder 30 may parse other syntax elements from the parameter set NAL unit (262).

In response to determining that the quantization matrix flag indicates that parameter set NAL unit only includes quantization matrices ("YES" of 260) or if video decoder 30 parses the other syntax elements in action 262, video decoder 30 may determine whether the quantization matrix flag indicates that the parameter set NAL unit includes quantization matrices (264). In response to determining that the quantization matrix flag indicates that the parameter set NAL unit includes quantization matrices ("YES" of 264), video decoder 30 may parse a quantization matrix table from the parameter set NAL unit (266). Video decoder 30 may parse the quantization matrix table in accordance with the example operation of FIG. 6. In response to determining that the quantization matrix flag indicates that the parameter set NAL unit does not include quantization matrices ("NO" of 264) or after parsing the quantization matrix table, video decoder 30 may be finished parsing the parameter set NAL unit.

FIG. 6 is a flowchart that illustrates an example operation 300 of video decoder 30 to parse a quantization matrix table in a parameter set NAL unit, in accordance with one or more techniques of this disclosure. In operation 300, video decoder 30 may parse a re-use flag (reuse_qm_tabe_flag) from the quantization matrix table (302). Video decoder 30 may then determine whether the re-use flag indicates that video decoder 30 is to re-use a quantization matrix table of a reference parameter set as the quantization matrix table of the current parameter set (304). In response to determining that the re-use flag indicates that video decoder 30 is to re-use the quantization matrix table of a reference parameter set as the quantization matrix table of the current parameter set ("YES" of 304), video decoder 30 may parse a re-use parameter set identifier (reused_aps_id) from the quantization matrix table (306). Video decoder 30 may use, as the quantization matrix table of the current parameter set, the quantization matrix table specified by the parameter set having the identifier specified by the re-use parameter set identifier.

On the other hand, in response to determining that the re-use flag indicates that video decoder 30 is not to re-use the quantization matrix table of a reference parameter set as the quantization matrix table of the current parameter set ("NO" of 304), video decoder 30 may parse a fragment flag (fragment_flag) from the quantization matrix table (308). The fragment flag may indicate whether the quantization matrix table includes all of the quantization matrices of the current parameter set. Video decoder 30 may determine whether the fragment flag indicates that the quantization matrix table includes all quantization matrices of the current parameter set (310).

In response to determining that the fragment flag indicates that the quantization matrix table does not include all quantization matrices of the current parameter set ("NO" of 310), video decoder 30 may parse from the quantization table a syntax element (num_ref_aps_for_qm) that indicates a number of quantization matrices in the quantization table (312). If the fragment flag indicates that the quantization matrix table does not include all quantization matrices of the current parameter set, the NAL unit may contain a fragment of the current parameter set, and not a complete parameter set.

Regardless of whether the fragment flag indicates that the quantization matrix table includes all quantization matrices of the current parameter set, video decoder 30 may determine whether the quantization matrix indicator indicates an inter-dependent prediction type (314). In the inter-dependent prediction type, video decoder 30 may determine a quantization matrix from within the quantization matrix, from other quantization matrices in the same parameter set NAL unit, from other quantization matrices from different NAL units of the same parameter set, and from other quantization matrices in different parameter sets.

In response to determining that the quantization matrix indicator indicates the inter-dependent prediction type ("YES" of 314), video decoder 30 may parse from the quantization table a syntax element (num_ref_aps_for_qm) that indicates a number of reference parameter sets (316). In addition, video decoder 30 may parse from the quantization table identifiers for each reference parameter set (ref_aps_id[i]) (318).

In response to determining that the quantization matrix indicator does not indicate the inter-dependent prediction type ("NO" of 314) or after performing actions 316 and 318, video decoder 30 may initialize a counter to zero and determine whether the counter is less than the number of quantization matrices in the quantization matrix table (320). In response to determining that the counter is less than the number of quantization matrices ("YES" of 320), video decoder 30 may parse a quantization matrix identifier for a current quantization matrix (quan_matrix_id[i]) from the quantization matrix table (322). The current quantization matrix may be the quantization matrix at a position in the quantization matrix table associated with the current value of the counter. In addition, video decoder 30 may determine whether the quantization matrix indicator indicates that only in-matrix prediction is allowed (i.e., quantization_matrix_idc=0) (324). When video decoder 30 performs in-matrix prediction, video decoder 30 may determine a quantization matrix based on a subset of the value of the quantization matrix.

In response to determining that the quantization matrix indicator does not indicate that only in-matrix prediction is allowed ("NO" of 324), video decoder 30 may parse from the quantization matrix table a syntax element (qm_prediction_mode) that indicates a prediction mode of the current quantization matrix (326). In response to determining that the quantization matrix indicator indicates that only in-matrix prediction is allowed ("YES" of 324) or after parsing the syntax element in action 326, video decoder 30 may determine whether the current quantization matrix is predicted from a reference parameter set (e.g., qm_prediction_mode==3) (328). In response to determining that the current quantization matrix is predicted from a reference picture set ("YES" of 328), video decoder 30 may parse from the quantization matrix table an identifier (ref_aps_idx) of the reference picture set (330).

In response to determining that the current quantization matrix is not predicted from a reference picture set ("NO" of 328) or after parsing the identifier in action 330, video decoder 30 may determine whether in-matrix prediction is allowed for the current quantization matrix (e.g., qm_prediction_mode>0) (332). In response to determining that in-matrix prediction is not allowed ("NO" of 332), video decoder 30 may parse from the quantization matrix table an identifier of the current quantization matrix (qm_id[i]) (334). In addition, video decoder 30 may parse from the quantization matrix table a skip flag (336).

After parsing the skip flag or after determining that in-matrix prediction is allowed ("YES" of 332), video decoder 30 may determine whether the skip flag indicates that coefficients are signaled in the quantization matrix table for the current quantization matrix (338). If the skip flag is not present, and therefore not parsed from the quantization matrix table, video decoder 30 may infer that the skip flag is equal to 0. In response to determining that coefficients are signaled in the quantization matrix table for the current quantization matrix ("YES" of 338), video decoder 30 may parse from the quantization matrix table coefficients of the current quantization matrix (340).

After parsing the coefficients for the current matrix or in response to determining that no coefficients are signaled in the quantization matrix table for the current quantization matrix ("NO" of 338), video decoder 30 may increment the counter and determine again whether the counter is less than the number of quantization matrices in the quantization matrix table (320). In this way, video decoder 30 may perform actions 322-340 with respect to each of the quantization matrices in the quantization matrix table. By selecting which prediction types to use for the quantization matrices, video encoder 20 may, if configured to do so, ensure that video decoder 30 is able to decode fragments of a parameter set independently.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
generating a first network abstraction layer (NAL) unit, the first NAL unit containing a first fragment of a parameter set associated with the video data, wherein the parameter set signals a plurality of quantization matrices and the first NAL unit comprises a flag that indicates whether the first NAL unit contains all of the quantization matrices of the parameter set or only a subset of the quantization matrices of the parameter set; and
generating a second NAL unit, the second NAL unit containing a second fragment of the parameter set, the first and second NAL units being non-video coding layer (VCL) NAL units.

2. The method of claim 1, wherein the parameter set is one of:
a sequence parameter set or a picture parameter set.

3. The method of claim 1, wherein the first fragment is decodable without reference to the second fragment and the second fragment is decodable without reference to the first fragment.

4. The method of claim 1, wherein the first NAL unit includes a flag that indicates that the first NAL unit includes one or more of the quantization matrices.

5. The method of claim 1, wherein the first NAL unit includes a first subset of the quantization matrices and the second NAL unit includes a second subset of the quantization matrices, wherein each quantization matrix in the first subset of quantization matrices is determinable without reference to data in the second NAL unit and each quantization matrix in the second subset of quantization matrices is determinable without reference to data in the first NAL unit.

6. The method of claim 1,
wherein a size of a NAL unit that contains the parameter set is larger than a size of a maximum transmission unit (MTU) of a communication protocol; and
wherein the method further comprises:
encapsulating the first NAL unit in a first packet of the communication protocol;
encapsulating the second NAL unit in a second packet of the communication protocol; and
sending the first and second packets on a communication channel.

7. The method of claim 1, wherein the first and second NAL units include syntax elements that identify the parameter set.

8. A method of decoding video data, the method comprising:
receiving a bitstream that comprises a first network abstraction layer (NAL) unit and a second NAL unit, the first NAL unit containing a first fragment of a parameter set, and the second NAL unit containing a second fragment of the parameter set, the first and second NAL units being non-video coding layer (VCL) NAL units, wherein the parameter set signals a plurality of quantization matrices and the first NAL unit comprises a flag that indicates whether the first NAL unit contains all of the quantization matrices of the parameter set or only a subset of the quantization matrices of the parameter set; and
decoding, based at least in part on the parameter set, one or more coded pictures of the video data.

9. The method of claim 8, wherein the parameter set is one of: a sequence parameter set or a picture parameter set.

10. The method of claim 8, wherein the first NAL unit includes a first subset of the quantization matrices and the second NAL unit includes a second subset of the quantization matrices, wherein each quantization matrix in the first subset of quantization matrices is determinable without reference to data in the second NAL unit and each quantization matrix in the second subset of quantization matrices is determinable without reference to data in the first NAL unit.

11. The method of claim 8, wherein receiving the bitstream comprises receiving a first and a second packet in a communication protocol, a first packet encapsulating the first NAL unit and a second packet encapsulating the second NAL unit.

12. The method of claim 8, wherein the first and second NAL units include syntax elements that identify the parameter set.

13. A device for encoding video data, the device comprising:
   a storage medium storing the video data; and
   one or more processors configured to:
      generate a first network abstraction layer (NAL) unit, the first NAL unit containing a first fragment of a parameter set associated with the video data, wherein the parameter set signals a plurality of quantization matrices and the first NAL unit comprises a flag that indicates whether the first NAL unit contains all of the quantization matrices of the parameter set or only a subset of the quantization matrices of the parameter set; and
      generate a second NAL unit, the second NAL unit containing a second fragment of the parameter set, the first and second NAL units being non-video coding layer (VCL) NAL units.

14. The device of claim 13, wherein the parameter set is one of: a sequence parameter set or a picture parameter set.

15. The device of claim 13, wherein the first fragment is decodable without reference to the second fragment and the second fragment is decodable without reference to the first fragment.

16. The device of claim 13, wherein the first NAL unit includes a flag that indicates that the first NAL unit includes one or more of the quantization matrices.

17. The device of claim 13, wherein the first NAL unit includes a first subset of the quantization matrices and the second NAL unit includes a second subset of the quantization matrices, wherein each quantization matrix in the first subset of quantization matrices is determinable without reference to data in the second NAL unit and each quantization matrix in the second subset of quantization matrices is determinable without reference to data in the first NAL unit.

18. The device of claim 13,
   wherein a size of a NAL unit that contains the parameter set is larger than a size of a maximum transmission unit (MTU) of a communication protocol; and
   wherein the one or more processors are configured to:
      encapsulate the first NAL unit in a first packet of the communication protocol;
      encapsulate the second NAL unit in a second packet of the communication protocol; and
      send the first and second packets on a communication channel.

19. The device of claim 13, wherein the first and second NAL units include syntax elements that identify the parameter set.

20. The device of claim 13, wherein the device comprises a video encoder.

21. A device for encoding video data, the device comprising:
   means for generating a first network abstraction layer (NAL) unit, the first NAL unit containing a first fragment of a parameter set associated with video data, wherein the parameter set signals a plurality of quantization matrices and the first NAL unit comprises a flag that indicates whether the first NAL unit contains all of the quantization matrices of the parameter set or only a subset of the quantization matrices of the parameter set; and
   means for generating a second NAL unit, the second NAL unit containing a second fragment of the parameter set, the first and second NAL units being non-video coding layer (VCL) NAL units.

22. A non-transitory computer-readable storage medium that stores instructions that, when executed by one or more processors of a device, cause the device to:
   generate a first network abstraction layer (NAL) unit, the first NAL unit containing a first fragment of a parameter set associated with video data, wherein the parameter set signals a plurality of quantization matrices and the first NAL unit comprises a flag that indicates whether the first NAL unit contains all of the quantization matrices of the parameter set or only a subset of the quantization matrices of the parameter set; and
   generate a second NAL unit, the second NAL unit containing a second fragment of the parameter set, the first and second NAL units being non-video coding layer (VCL) NAL units.

23. A device for decoding video data, the device comprising:
   a storage medium storing the video data; and
   one or more processors configured to:
      receive a bitstream that comprises a first network abstraction layer (NAL) unit and a second NAL unit, the first NAL unit containing a first fragment of a parameter set associated with the video data, and the second NAL unit containing a second fragment of the parameter set, the first and second NAL units being non-video coding layer (VCL) NAL units, wherein the parameter set signals a plurality of quantization matrices and the first NAL unit comprises a flag that indicates whether the first NAL unit contains all of the quantization matrices of the parameter set or only a subset of the quantization matrices of the parameter set; and
      decode, based at least in part on the parameter set, one or more coded pictures of the video data.

24. The device of claim 23, wherein the parameter set is one of: a sequence parameter set 29, wherein the first NAL unit includes a first subset of the quantization matrices and the second NAL unit includes a second subset of the quantization matrices, wherein each quantization matrix in the first subset of quantization matrices is determinable without reference to data in the second NAL unit and each quantization matrix in the second subset of quantization matrices is determinable without reference to data in the first NAL unit.

25. The device of claim 23, wherein the first NAL unit includes a first subset of the quantization matrices and the second NAL unit includes a second subset of the quantization matrices, wherein each quantization matrix in the first subset of quantization matrices is determinable without reference to data in the second NAL unit and each quantization matrix in the second subset of quantization matrices is determinable without reference to data in the first NAL unit.

26. The device of claim 23, wherein:
   a size of a NAL unit that contains the parameter set is larger than a maximum transmission unit (MTU) of a communication protocol, and
   the one or more processors are configured to receive a first and a second packet in the communication protocol, the first packet encapsulating the first NAL unit and the second packet encapsulating the second NAL unit.

27. The device of claim 23, wherein the first and second NAL units include syntax elements that identify the parameter set.

28. The device of claim 23, wherein the device comprises a video decoder.

29. A device for decoding video data, the computing device comprising:

means for receiving a bitstream that comprises a first network abstraction layer (NAL) unit and a second NAL unit, the first NAL unit containing a first fragment of a parameter set, and the second NAL unit containing a second fragment of the parameter set, the first and second NAL units being non-video coding layer (VCL) NAL units, wherein the parameter set signals a plurality of quantization matrices and the first NAL unit comprises a flag that indicates whether the first NAL unit contains all of the quantization matrices of the parameter set or only a subset of the quantization matrices of the parameter set; and means for decoding, based at least in part on the parameter set, one or more coded pictures of video data.

30. A non-transitory computer-readable storage medium that stores instructions that, when executed by one or more processors of a device, cause the computing device to:

receive a bitstream that comprises a first network abstraction layer (NAL) unit and a second NAL unit, the first NAL unit containing a first fragment of a parameter set, and the second NAL unit containing a second fragment of the parameter set, the first and second NAL units being non-video coding layer (VCL) NAL units, wherein the parameter set signals a plurality of quantization matrices and the first NAL unit comprises a flag that indicates whether the first NAL unit contains all of the quantization matrices of the parameter set or only a subset of the quantization matrices of the parameter set; and decode, based at least in part on the parameter set, one or more coded pictures of video data.

\* \* \* \* \*